(No Model.)
W. L. COULTAS, Jr.
SPINDLE FOR REELING OR ROLLING PAPER.
No. 559,682. Patented May 5, 1896.
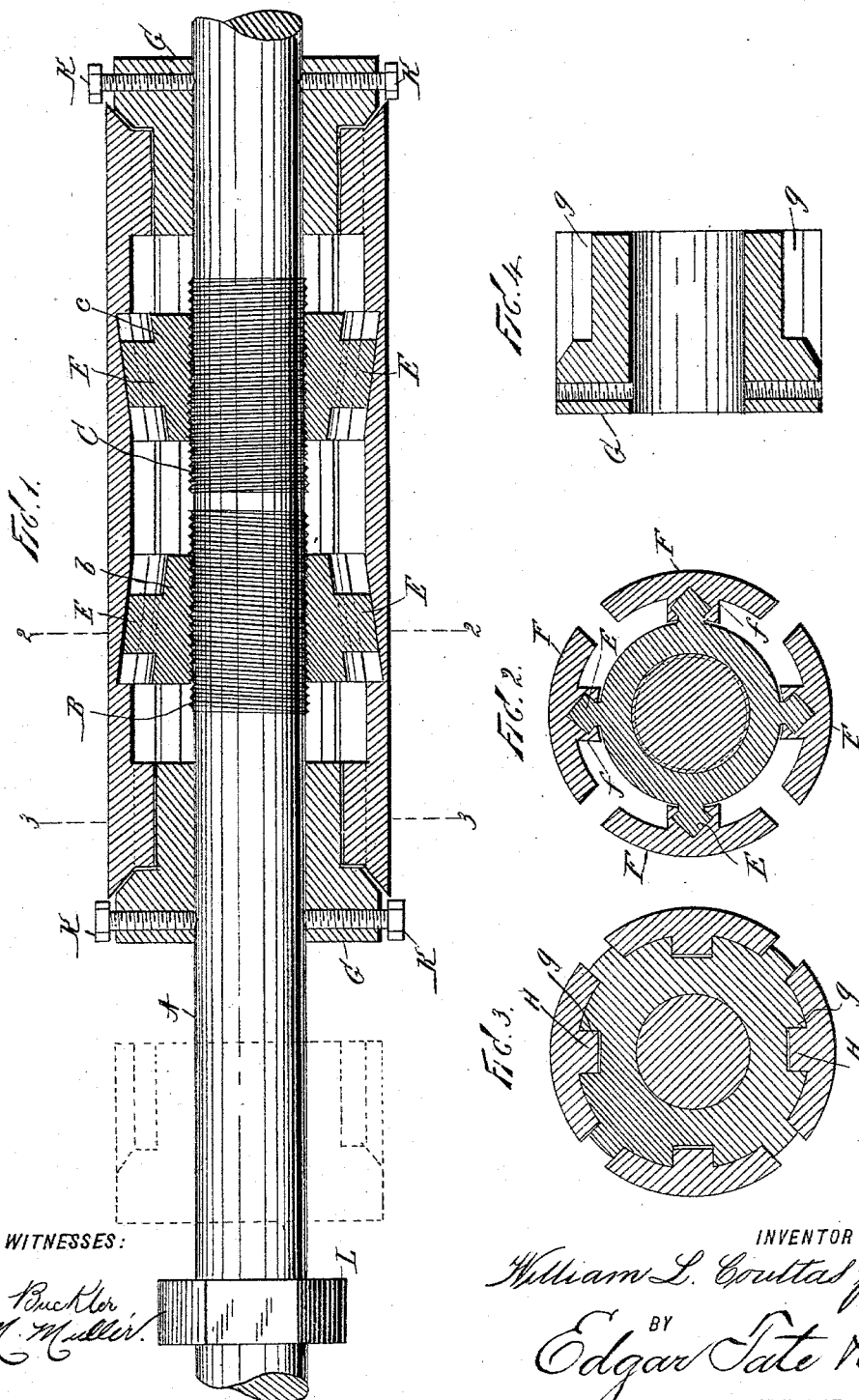
WITNESSES:
John Buckler
L. M. Muller
INVENTOR
William L. Coultas Jr
BY
Edgar Tate & Co
ATTORNEYS.

UNITED STATES PATENT OFFICE

WILLIAM LEANDER COULTAS, JR., OF BROOKLYN, NEW YORK, ASSIGNOR TO W. L. COULTAS, SR., OF SAME PLACE.

SPINDLE FOR REELING OR ROLLING PAPER.

SPECIFICATION forming part of Letters Patent No. 559,682, dated May 5, 1896.

Application filed July 18, 1895. Serial No. 556,323. (No model.)

*To all whom it may concern:*

Be it known that I, WILLIAM LEANDER COULTAS, Jr., a citizen of the United States, and a resident of Brooklyn, in the county of Kings and State of New York, have invented certain new and useful Improvements in Spindles for Reeling or Rolling Paper, of which the following is a specification, reference being had to the accompanying drawings, forming a part thereof, in which similar letters of reference indicate corresponding parts.

This invention relates to paper-rolling machinery, and the object thereof is to provide an improved spindle or reel for such machines on which may be rolled or reeled large rolls of paper, such as are used in printing-presses and for other purposes; and with these and other objects in view the invention consists in a spindle or reel so constructed that it can be taken out after the paper roll has been formed thereon and at once reused, thus avoiding the cost of transporting the spindle or reel with the roll of paper, as is now done, and then reshipping the reel or spindle back to the place from which the paper was sent.

The invention is fully disclosed in the following specification, of which the accompanying drawings form a part, and in which—

Figure 1 is a longitudinal section of my improved reel or spindle, showing also the shaft on which it is mounted; Fig. 2, a section on the line 2 2 of Fig. 1; Fig. 3, a section on the line 3 3 of Fig. 1, and Fig. 4 a longitudinal section of one of the heads which form part of my improved spindle or reel.

In the practice of my invention I employ the usual shaft A, provided centrally with a right-hand screw-thread, as at B, and adjacent thereto with a left-hand screw-thread, as at C, and mounted thereon are correspondingly screw-threaded nuts $b$ and $c$.

The nuts $b$ and $c$ are conical in form on their outer surfaces, the base of each being directed outward, and each of said nuts is connected with longitudinal plates F, which form the outer portion of the spindle or reel and which are segmental in cross-section, as clearly shown in Figs. 2 and 3, each of which is also provided with inwardly-directed longitudinal extensions $f$, with which the nuts are connected by means of extensions E, which are irregular in form in cross-section, and said connection being made by means of a tongue-and-groove construction in such manner that the nuts E are adapted to move toward or from each other, as will be readily understood.

The longitudinal inwardly-directed extensions of the segmental plates F are inclined so as to correspond with a wedge-shaped or conical form of the nuts E, and it will be observed that when said nuts are moved outwardly the segmental plates F are drawn together and the size or diameter of the spindle or reel decreased, and when said nuts are moved inward or caused to approach each other the segmental plates E are forced apart and the size or diameter of the spindle or reel increased, as will be readily understood.

Connected with the shaft A, at each end of the segmental plates F, is a head or sleeve G, provided with longitudinal grooves or recesses $g$, the outer surfaces of which are beveled, as shown in Fig. 4, and the inner surfaces of each of the segmental plates F at each end is provided with correspondingly-formed inwardly-directed flanges H, adapted to fit within said recesses $g$, this construction being clearly shown in Figs. 3 and 4. The shaft A is also provided with a nut L, by means of which a wrench may be applied thereto, and the operation will be readily understood from the foregoing description when taken in connection with the accompanying drawings.

By applying a wrench and turning the shaft to the right the nuts E will be drawn together and the segmental plates F will be forced apart, as hereinbefore described, thereby increasing the diameter of the reel or spindle. The heads or sleeves G are then shoved into place and secured by set-screws K, and these heads or sleeves when in position will prevent any lateral movement of the segmental strips in the operation of the shaft or the rolling or reeling of the paper thereon. After the paper has been reeled or rolled the spindle may be taken therefrom by turning the shaft A to the left, by which operation the nuts E will be forced apart and the segmental plates F drawn toward the center, thus decreasing the size or diameter of the spindle, when the latter may be readily removed from the roll of paper.

The object of the longitudinal grooves or recesses $g$ in the heads G and the corresponding longitudinal projections or shoulders H in the segmental plates F is to prevent the latter from turning on the shaft, and the construction of these parts is such as to admit of the outward and inward movement of the plates, as hereinbefore described.

It will thus be seen that I accomplish the object of my invention by means of a device simple in construction and operation, and which is also perfectly adapted to accomplish the result for which it is intended.

It is evident that changes in the form, construction, and arrangement of the various elements of my improved spindle or reel may be made without departing from the spirit of my invention or sacrificing its advantages, and I therefore reserve the right to make such alterations therein as fairly come within the scope of the invention.

Having fully described my invention, I claim and desire to secure by Letters Patent—

1. In a spindle for reeling or rolling paper, the combination with a shaft having a right and left screw-threaded portion, of the movable heads or sleeves, having longitudinal grooves, mounted upon said shaft, right and left screw-threaded nuts mounted on said spindle, longitudinal plates connected with said nuts, and means carried by said heads to secure the same in position upon said shaft, substantially as described.

2. In a spindle for reeling or rolling paper, the combination with a shaft, of movable heads or sleeves connected therewith, right and left screw-threaded nuts mounted on said spindle between said heads by means of corresponding threads formed thereon, longitudinal plates, segmental in cross-section, connected with said nuts and adapted to be forced outward or drawn inward thereby when the shaft is revolved in opposite directions, said heads or sleeves being also provided with longitudinal grooves or recesses adapted to receive corresponding longitudinal projections formed on the inner surfaces of said end plates, substantially as shown and described.

3. In a spindle for reeling or rolling paper, the combination with a shaft, of movable heads or sleeves connected therewith, right and left screw-threaded nuts mounted on said spindle between said heads by means of corresponding threads formed thereon, longitudinal plates, segmental in cross-section, connected with said nuts and adapted to be forced outward or drawn inward thereby when the shaft is revolved in opposite directions, said heads or sleeves being also provided with longitudinal grooves or recesses adapted to receive corresponding longitudinal projections formed on the inner surfaces of said end plates, said heads or sleeves being longitudinally movable on the shaft and provided with means for securing them in the desired position, substantially as shown and described.

In testimony that I claim the foregoing as my invention I have signed my name, in presence of two witnesses, this 8th day of July, 1895.

WILLIAM LEANDER COULTAS, Jr.

Witnesses:
WILLIAM LEANDER COULTAS, Sr.,
THOMAS GRAHAM.